(12) United States Patent
Ellis et al.

(10) Patent No.: US 11,480,660 B2
(45) Date of Patent: Oct. 25, 2022

(54) ARRAYED MEMS MIRRORS FOR LARGE APERTURE APPLICATIONS

(71) Applicant: Microvision, Inc., Redmond, WA (US)

(72) Inventors: Matthew Ellis, Sammamish, WA (US); Jonathan A. Morarity, Seattle, WA (US); Alga Lloyd Nothern, III, Seattle, WA (US)

(73) Assignee: Microvision, Inc., Redmond, WA (US)

( * ) Notice: Subject to any disclaimer, the term of this patent is extended or adjusted under 35 U.S.C. 154(b) by 777 days.

(21) Appl. No.: 16/506,836

(22) Filed: Jul. 9, 2019

(65) Prior Publication Data

US 2021/0011132 A1    Jan. 14, 2021

(51) Int. Cl.
| | |
|---|---|
| *G01S 7/481* | (2006.01) |
| *G02B 26/10* | (2006.01) |
| *G02B 26/08* | (2006.01) |
| *G01S 17/10* | (2020.01) |

(52) U.S. Cl.
CPC ............ *G01S 7/4817* (2013.01); *G01S 17/10* (2013.01); *G02B 26/0833* (2013.01); *G02B 26/101* (2013.01)

(58) Field of Classification Search
CPC ...... G01S 7/4817; G01S 7/4185; G01S 17/10; G02B 26/105; G02B 26/0816; G02B 26/0833; G02B 26/101
USPC ......... 359/197.1, 201.1, 201.2, 202.1, 212.1, 359/212.2, 220.1, 223.1, 226.2
See application file for complete search history.

(56) References Cited

U.S. PATENT DOCUMENTS

| | | | |
|---|---|---|---|
| 7,609,875 B2 | 10/2009 | Liu et al. | |
| 8,446,571 B2 | 5/2013 | Fiess et al. | |
| 9,098,931 B2 | 8/2015 | Shpunt et al. | |
| 9,267,787 B2 | 2/2016 | Shpunt | |
| 9,651,417 B2 | 5/2017 | Shpunt et al. | |
| 9,677,878 B2 | 6/2017 | Shpunt et al. | |
| 9,753,351 B2 | 9/2017 | Eldada | |
| 9,804,264 B2 | 10/2017 | Villenueve et al. | |
| 9,823,353 B2 | 11/2017 | Eichenholz et al. | |
| 9,841,495 B2 | 12/2017 | Campbell et al. | |
| 9,857,468 B1 | 1/2018 | Eichenholz et al. | |
| 9,869,754 B1 | 1/2018 | Campbell et al. | |
| 9,874,635 B1 | 1/2018 | Eichenholz et al. | |
| 9,897,687 B1 | 2/2018 | Campbell et al. | |
| 9,898,074 B2 | 2/2018 | Shpunt et al. | |
| 9,958,545 B2 | 5/2018 | Eichenholz et al. | |
| 10,237,515 B2 * | 3/2019 | Adler | H04N 9/3188 |
| 11,353,559 B2 * | 6/2022 | Campbell | G01S 17/931 |

(Continued)

OTHER PUBLICATIONS

Bifano, et al., "Large-scale Metal MEMS Mirror Arrays with Integrated Electronics", Proc. SPIE 4755, Design, Test, Integration, and Packaging of MEMS/MOEMS 2002, Apr. 19, 2002.

(Continued)

*Primary Examiner* — William C. Dowling
(74) *Attorney, Agent, or Firm* — Kevin D. Wills

(57) ABSTRACT

A light detection and ranging system includes multiple scanning mirror assemblies to increase a receive aperture. The multiple scanning mirror assemblies are controlled to mimic the operation of one large scanning mirror. The multiple scanning mirror assemblies may be arranged in one-dimensional arrays or two-dimensional arrays. Two arrays of scanning mirror assemblies provide for scanning in two dimensions.

20 Claims, 13 Drawing Sheets

(56) References Cited

U.S. PATENT DOCUMENTS

| | | |
|---|---|---|
| 2016/0195386 A1 | 7/2016 | Yoon et al. |
| 2017/0090032 A1 | 3/2017 | Ridderbusch |
| 2017/0090034 A1 | 3/2017 | Ridderbusch |
| 2017/0131388 A1 | 5/2017 | Campbell et al. |
| 2017/0153319 A1 | 6/2017 | Villeneuve et al. |
| 2017/0176596 A1 | 6/2017 | Shpunt et al. |
| 2017/0205873 A1 | 7/2017 | Shpunt et al. |
| 2017/0244955 A1 | 8/2017 | Shpunt et al. |
| 2018/0088236 A1 | 3/2018 | Eichenholz et al. |
| 2018/0120433 A1 | 5/2018 | Eichenholz et al. |
| 2020/0018837 A1* | 1/2020 | Baron .................. G01S 7/4815 |
| 2020/0379090 A1* | 12/2020 | Nothern, III .......... G01S 7/4815 |
| 2020/0379092 A1* | 12/2020 | Morarity ................ G01S 17/42 |
| 2021/0011132 A1* | 1/2021 | Ellis ..................... G02B 26/101 |
| 2021/0011133 A1* | 1/2021 | Morarity ................ G01S 7/484 |
| 2021/0011279 A1* | 1/2021 | Ellis ..................... G01S 7/4865 |
| 2021/0033845 A1* | 2/2021 | Matthew ............... G01S 17/931 |
| 2022/0244358 A1* | 8/2022 | Dean ...................... G01S 17/89 |

OTHER PUBLICATIONS

Buswell, et al., "High Fill Factor MEMS Mirror Array", IEEE 2012, Aug. 1, 2012.
Sandner, et al., "3D Imaging Using Resonant Large-Aperture MEMS Mirror Arrays and Laser Distance Measurement", IEEE 2008, Sep. 1, 2008.

* cited by examiner

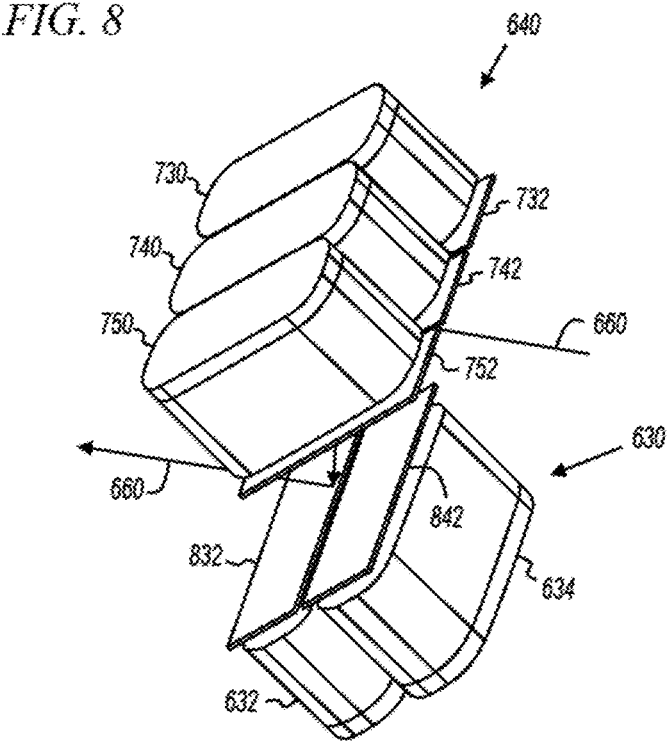
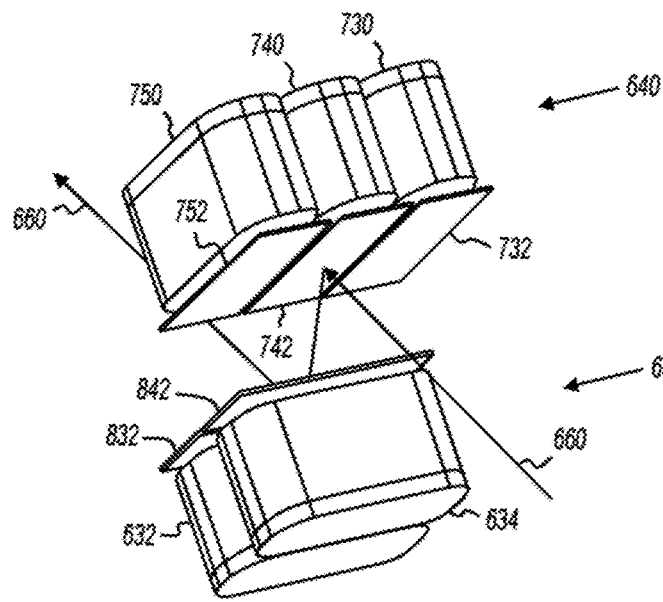

| Vehicle Speed (kph) | 0-30 | 30-70 | 70+ |
|---|---|---|---|
| Scene Rate (Hz) | 60 | 120 | 240 |
| HFOV (deg) | 120 | 60 | 30 |
| VFOV (deg) | 30 | 20 | 15 |
| Optimized Range (m) | 30 | 90 | 240 |
| H Resolution @ Scene Rate (deg) | 0.10 | 0.10 | 0.10 |
| V Resolution @ Scene Rate (deg) | 0.03 | 0.06 | 0.12 |
| H Resolution @ 30Hz (deg) | 0.05 | 0.05 | 0.05 |
| V Resolution @ 30Hz (deg) | 0.03 | 0.03 | 0.03 |
| Pulse Rate | Nom | ▼ | ▼▼ |
| Pulse Power | Nom | ▲ | ▲▲ |
| Pulse Energy | Nom | ▲ | ▲▲ |

ARRAYED MEMS MIRRORS FOR LARGE APERTURE APPLICATIONS

FIELD

The present invention relates generally to light detection and ranging (LIDAR) systems, and more specifically to scanning LIDAR systems.

BACKGROUND

Increasing the aperture of the receiving element in optical sensing applications increases detection sensitivity. For example, throughout history optical telescopes have constantly strived to increase the area of the receiving mirror, such that now telescopes are being developed that have mirrors approximately 40 meters in diameter.

Increasing the size of the receiving mirror in light detecting and ranging (LIDAR) applications substantially improves the performance of the device for the same reason—larger mirrors can collect more photons. LIDAR mirrors are typically required to move very fast (up to many kHz), rotating about an axis to collect photons from different directions. System power requirements increase with mirror size and speed of movement, resulting in a significant design challenge for large aperture LIDAR systems. The moment of inertia of a mirror is proportional to the square of its radius, and the torque required to move the mirror is proportional to its moment of inertia. Accordingly, large mirrors require high torque and thus high power to move at high frequency.

BRIEF DESCRIPTION OF THE DRAWINGS

FIGS. 8 and 9 show scanning mirror assemblies with arrays of scanning MEMS devices;

FIG. 21 shows alternate scanning patterns in the field of view in accordance with various embodiments of the present invention.

DESCRIPTION OF EMBODIMENTS

Figure 1:
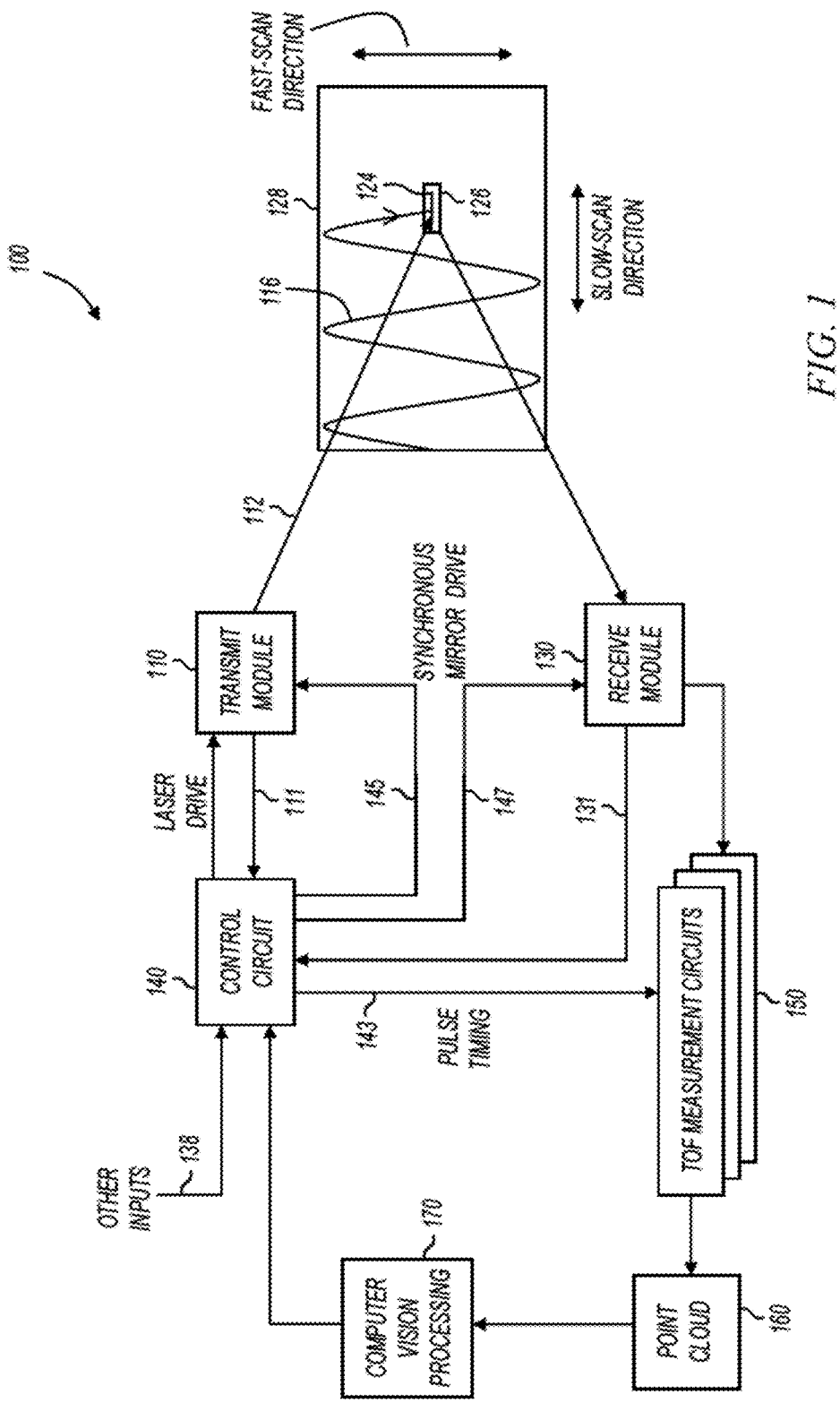
FIG. 1 shows a LIDAR system with arrayed MEMS mirrors in accordance with various embodiments of the present invention.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

FIG. 1 shows a LIDAR system with arrayed MEMS mirrors in accordance with various embodiments of the present invention. System 100 includes control circuit 140, transmit module 110, receive module 130, time-of-flight (TOF) measurement circuits 150, point cloud storage device 160, and computer vision processing 170.

Transmit module 110 emits a scanning pulsed fanned laser beam 112 that traverses a field of view 128 in two dimensions. The shape of the fanned beam is shown at 124, and the scanning trajectory that the pulsed fanned beam takes through the field of view is shown at 116. To produce the scanning pulsed fanned beam, transmit module 110 includes a laser light source to produce a pulsed laser beam, collimating and focusing optics to shape the pulsed laser beam into a pulsed fanned laser beam, and one or more scanning mirrors to scan the pulsed fanned laser beam in two dimensions in the field of view. Example embodiments of transmit modules are described more fully below with reference to later figures.

Receive module 130 includes an arrayed receiver that includes a plurality of light sensitive devices. Receive module 130 also includes optical devices and multiple scanning mirrors to scan in two dimensions and to direct reflected light from the field of view to the arrayed receiver. As shown in FIG. 1, receive module 130 captures reflected light from an area 126 that encompasses the location of the fanned beam in the field of view. Example embodiments of receive modules are described more fully below with reference to later figures.

The reflected fanned beam becomes "discretized" by the array of light sensitive devices, and the corresponding points in the field of view from which the beam is reflected are referred to herein as "measurement points."

As used herein, the term "fanned beam" refers to a beam of light that has been purposely shaped to encompass more measurement points in one dimension than in another dimension. For example, as shown in FIG. 1, fanned beam 112 includes shape 124 that encompasses more measurement points in the horizontal dimension than in the vertical dimension.

Time-of-flight (TOF) measurement circuits 150 are each coupled to one of the light sensitive devices in the arrayed receiver to measure a time-of-flight of a laser pulse. TOF measurement circuits 150 receive laser light pulse timing information 143 from control circuit 140 and compare it to the timing of received laser light pulses to measure round trip times-of-flight of light pulses, thereby measuring the distance (Z) to the point in the field of view from which the laser light pulse was reflected. Accordingly, TOF measurement circuits 150 measure the distance between LIDAR system 100 and measurement points in the field of view at which light pulses from the scanned fanned beam are reflected.

TOF measurement circuits 150 may be implemented with any suitable circuit elements. For example, in some embodiments, TOF measurement circuits 150 include digital and/or analog timers, integrators, correlators, comparators, registers, adders, or the like to compare the timing of the reflected laser light pulses with the pulse timing information received from control circuit 140.

Point cloud storage 160 receives TOF information corresponding to distance (Z) information from TOF measurement circuits 150. In some embodiments, the TOF measurements are held in point cloud storage 160 in an array format such that the location within point cloud storage 160 indicates the location within the field of view from which the measurement was taken. In other embodiments, the TOF measurements held in point cloud storage 160 include (X,Y) position information as well as TOF measurement information to yield (X,Y,Z) as a three dimensional (3D) data set that represents a depth map of the measured portion of the field of view 128. The point cloud data may then be used for any suitable purpose. Examples include 3D imaging, velocity field estimation, object recognition, adaptive field of view modifications, and the like.

Point cloud storage 160 may be implemented using any suitable circuit structure. For example, in some embodiments, point cloud storage 160 is implemented in a dual port memory device that can be written on one port and read on a second port. In other embodiments, point cloud storage 160 is implemented as data structures in a general purpose memory device. In still further embodiments, point cloud storage 160 is implemented in an application specific integrated circuit (ASIC).

Computer vision processing 170 perform analysis on the point cloud data and provide feedback to control circuit 140. For example, in some embodiments, computer vision processing 170 performs object identification, classification, and tracking within the field of view, and provides this information to control circuit 140. Computer vision processing 170 may take any form, including neural networks of any depth, convolutional neural nets, traditional vision processing methods, and the like. In some embodiments, computer vision processing 170 is omitted.

Control circuit 140 determines laser drive properties and drives transmit module 110 with signal(s) that cause the light source to emit laser light pulses having the specified properties. For example, control circuit 140 may determine values for laser drive power, pulse rate, pulse width, and number of multishot pulses. Further, as described more fully below, control circuit 140 may adaptively modify the laser drive properties in response to feedback from Computer vision processing 170 or in response to other inputs 138.

Control circuit 140 also controls the movement of scanning mirrors within transmit module 110 and receive module 130. In operation, control circuit 140 receives mirror position feedback information 111 from transmit module 110, and also receives mirror position feedback information 131 from receive module 130. The mirror position feedback information is used to phase lock the operation of the mirrors. For example, in some embodiments, the mirror position feedback information is used to phase lock the amplitude and/or frequency of mirror movements. Control circuit 140 drives microelectromechanical (MEMS) assemblies with scanning mirrors within transmit module 110 with drive signal(s) 145 and also drives MEMS assemblies with scanning mirrors within receive module 130 with drive signal(s) 147 that cause the mirrors to move non-resonantly through angular extents of mirror deflection with angular offsets that define the size and location of field of view 128. Control circuit 140 synchronizes the movement between mirrors in transmit module 110 and receive module 130 so that area 126 is continually positioned in the field of view to receive light reflected from objects that are illuminated with pulsed fanned beam 112. The synchronization of transmit and receive scanning allows the receive aperture to only accept photons from the portion of the field of view where the transmitted energy was transmitted. This results in significant ambient light noise immunity.

Control circuit 140 is implemented using functional circuits such as phase lock loops (PLLs), filters, adders, multipliers, registers, processors, memory, and the like. Accordingly, control circuit 140 may be implemented in hardware, software, or in any combination. For example, in some embodiments, control circuit 140 is implemented in an application specific integrated circuit (ASIC). Further, in some embodiments, some of the faster data path control is performed in an ASIC and overall control is software programmable.

As shown in FIG. 1, the two dimensional scanning is performed in a first dimension (vertical, fast scan direction) and a second dimension (horizontal, slow scan direction). The labels "vertical" and "horizontal" are somewhat arbitrary, since a 90 degree rotation of the apparatus will switch the horizontal and vertical axes. Accordingly, the terms "vertical" and "horizontal" are not meant to be limiting.

The scanning trajectory in the fast scan direction is shown as sinusoidal, and the scanning trajectory in the slow scan direction is shown as constant velocity, although this is not a limitation of the present invention. In some embodiments, all mirror motion is operated non resonantly. Accordingly, a relatively flat control band exists down to and including 0 Hz. This allows a drive signal to be generated to cause the pointing angle (boresight) of the LIDAR system to deflect to a desired position in two dimensions (azimuth & elevation) of a spherical coordinate space, offset from the mirror relaxation point.

The angular extents of mirror deflection of both the transmit and receive modules can be adjusted to change the active field of view of the LIDAR system. The MEMS mirrors are designed for reliable operation at some maximum angle of deflection along each scan axis. From that nominal/max operating point, the drive amplitude may be reduced to collapse the deflection angle and narrow the active field of view. All else being equal, this results in a proportional increase in the angular resolution of the acquired scene.

In some embodiments, it is beneficial to trade off surplus angular resolution for increased range of measurement. For example, reducing the pulse repetition rate allows for a longer flight time in between adjacent pulses, eliminating range aliasing out to a proportionally larger distance. Accordingly, a balance exists such that reducing the field of view increases the non-ambiguous range of the LIDAR system without changing the angular resolution of the acquired scene. In some embodiments, laser power modifications are performed as a complement to increased range. For example, the laser power may be scaled as the square of the proportional increase in range.

Though the scanned field of view, pulse repetition rate, and laser power may all be independently controlled by software configuration, in some embodiments, it may be desirable to also design them to be commanded in a coordinated manner, automatically under hardware control. Examples are provided below.

Pulse width may also be controlled in the same manner in order to augment the scaled distance of interest. As the pulse width is increased, additional energy is deposited into the scene, increasing the likelihood of a sufficient number of photons returning to the receiver to trip the detection threshold. In some embodiments, increasing the pulse width is only performed when the peak power is maxed out as a wider pulse increases time resolution error for weak returns. This tradeoff is often warranted and useful as absolute time/distance resolution is typically not as important as percentage error which self-normalizes with distance.

Pulse energy may also be augmented by means of a train of shorter multishot pulses. The number of pulses may be varied to achieve the desired amount of energy in addition to or in place of modification of the pulse width.

Various embodiments of receive module 130 include multiple MEMS assemblies with scanning mirrors positioned to form an array to increase the size of the receive aperture. For example, in some embodiments, one dimensional arrays of scanning mirrors are positioned to scan in both the horizontal and vertical directions, and in other embodiments, two dimensional arrays of scanning mirrors are positioned to scan in both the horizontal and vertical directions. These and other embodiments are described further below with reference to later figures.

Figure 2:
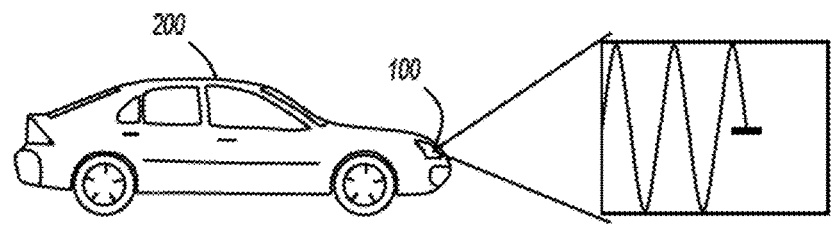
FIG. 2 shows an automotive application of a LIDAR system with arrayed MEMS mirrors in accordance with various embodiments of the present invention.

FIG. 2 shows an automotive application of a LIDAR system with arrayed MEMS mirrors in accordance with various embodiments of the present invention. As shown in FIG. 2, vehicle 200 includes LIDAR system 100 at the front of the vehicle. LIDAR system 100 synchronously scans transmit and receive scanning mirrors such that area 126 substantially overlaps the shape 124 of the pulsed fanned beam. Although much of the remainder of this description describes the LIDAR system in the context of an automotive application, the various embodiments of the present invention are not limited in this respect.

Figure 3:
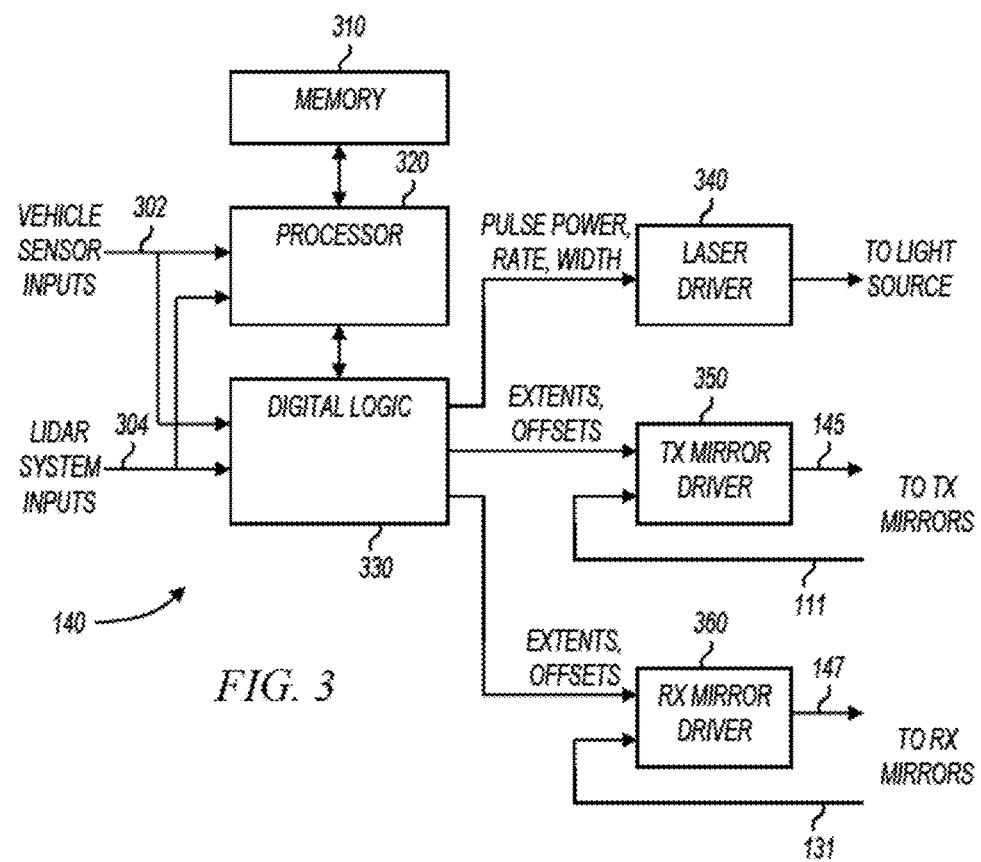
FIG. 3 shows a block diagram of a control circuit in accordance with various embodiments of the present invention.

FIG. 3 shows a block diagram of a control circuit in accordance with various embodiments of the present invention. The example embodiment shown in FIG. 3 corresponds to a control circuit that may be included when LIDAR system 100 is used in an automotive application. Other control circuit embodiments may be employed when used in applications other than automotive applications. Control circuit 140 includes processor 320, memory 310, digital logic 330, laser driver 340, transmit mirror driver 350, and receive mirror driver 360. Control circuit 140 receives vehicle sensor inputs at 302 and LIDAR system inputs at 304. Vehicle sensor inputs may include any type of data produced by sensors on a vehicle. Examples include data describing vehicle position, speed, acceleration, direction. Other examples include sensor data received from adaptive driver assistance systems (ADAS) or other vehicle mounted sensors. LIDAR system inputs may include any data gathered or produced by the LIDAR system. Examples include computer vision processing results, internal inertial measurement unit data, and the like.

Processor 320 may include any type of processor capable of executing instructions stored in a memory device. For example, processor 320 may be a microprocessor, a digital signal processor, or a microcontroller. Processor 320 may also be a hard-coded processor such as a finite state machine that provides sequential flow control without fetching and executing instructions.

Memory 310 may be any device that stores data and/or processor instructions. For example, memory 310 may be a random access memory device that stores data. In some embodiments, memory 310 is a nontransitory storage device that stores instructions, that when accessed by processor 320 result in processor 320 performing actions. For example, in some embodiments, processor 320 executes instructions stored in memory 310 and performs method embodiments of the present invention.

Digital logic 330 receives vehicle sensor inputs at 302 and LIDAR system inputs at 304 and outputs information used to control a laser light source and scanning mirrors. Digital logic 330 may produce the outputs based solely on the vehicle sensor data and/or LIDAR system data, may produce the outputs based solely on interactions with processor 320, or may produce the outputs based on a combination of the vehicle sensor data, LIDAR system data, and interaction with processor 320. For example, in some embodiments, digital logic 330 modifies laser light pulse parameters such as pulse power, repetition rate, pulse width, and number of multishot pulses in response to vehicle sensor data and/or LIDAR system data. Also for example, in some embodiments, digital logic 330 modifies angular extents and angular offsets used to drive the scanning mirrors in the transmit module and receive module in response to vehicle sensor data and/or LIDAR system data.

In some embodiments, digital logic 330 provides output data under software control via interaction with processor 320. For example, processor 320 may determine values for any of the outputs in response to vehicle sensor data and/or LIDAR system data, and then command digital logic under software control. In other embodiments, digital logic 330 may provide output data under hardware control independent of processor 320. For example, an adaptive model may be programmed into digital logic 330 in advance, and digital logic 330 may then modify outputs as a function vehicle sensor data and/or LIDAR system data at a much faster rate. Examples of adaptive modes (under software control and hardware accelerated) are described more fully below with reference to later figures.

Laser driver 340 receives laser light properties from digital logic 330 and drives the laser light source. For example, laser driver 340 may receive property values for pulse power, pulse repetition rate, pulse width, and number of multishot pulses, and produce an analog signal to drive a laser light source. Laser driver 340 may be implemented with any suitable circuit elements including for example, high speed signal generators, amplifiers, filters, and the like.

Mirror drivers 350, 360 receive angular extent and angular offset information from digital logic 330 and mirror position feedback information 111, 131, and produce drive signals 145, 147 to cause scanning mirrors in modules 110, 130 to undergo motion. Transmit mirror driver 350 and receive mirror driver 360 may be implemented using any suitable circuit structures including for example, phase lock loops, numerically controlled oscillators, filters, amplifiers, and the like.

Figure 4:
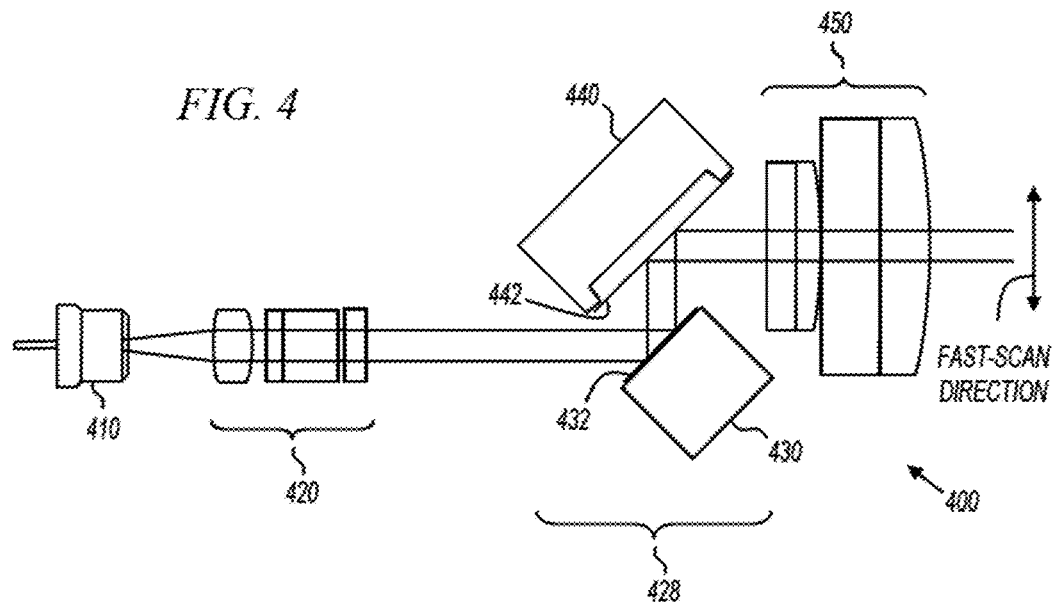
FIG. 4 shows a side view of a transmit module in accordance with various embodiments of the present invention.
Figure 5:
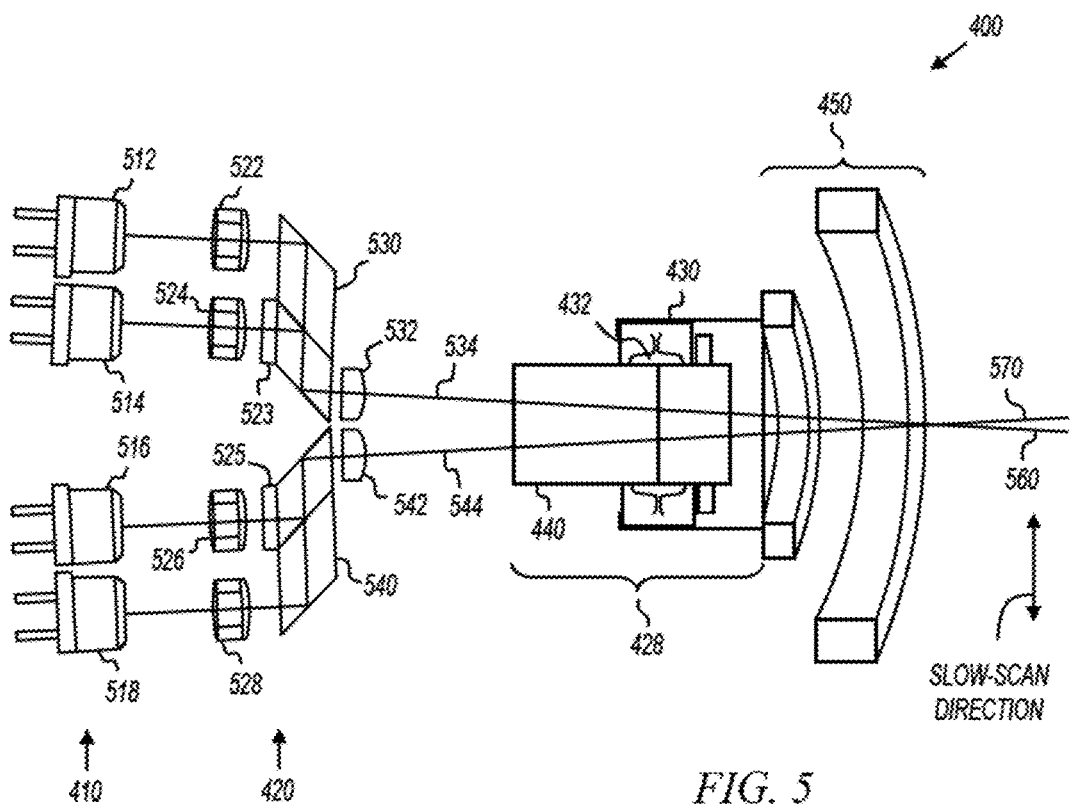
FIG. 5 shows a top view of a transmit module in accordance with various embodiments of the present invention.

FIG. 4 shows a side view and FIG. 5 shows a top view of a transmit module in accordance with various embodiments of the present invention. Transmit module 110 includes laser light source 410, beam shaping optical devices 420, scanning mirror assembly 428, and exit optical devices 450.

In some embodiments, laser light source 410 sources nonvisible light such as infrared (IR) light. In these embodiments, the receive module 130 (FIG. 1) is able to detect the same wavelength of nonvisible light. For example, in some embodiments, light source 410 may include a laser diode that produces infrared light with a wavelength of substantially 905 nanometers (nm), and receive module 130 detects reflected light pulses with a wavelength of substantially 905 nm. Also for example, in some embodiments, light source 410 may include a laser diode that produces infrared light with a wavelength of substantially 940 nanometers (nm), and receive module 130 detects reflected light pulses with a wavelength of substantially 940 nm. The wavelength of light is not a limitation of the present invention. Any wavelength, visible or nonvisible, may be used without departing from the scope of the present invention.

Laser light source 410 may include any number or type of emitter suitable to produce a pulsed fanned laser beam. For example, in some embodiments, laser light source 410 includes multiple laser diodes shown in FIG. 5 at 512, 514, 516, and 518. The pulsed laser light produced by laser light source 410 is combined, collimated, and focused by beam shaping optical devices 420 to produce a pulsed fanned laser beam. For example, optical devices 522 may collimate the laser beams on the fast (vertical) axis, polarization rotators 523 and beam combiners 520 may combine laser beams, and optical devices 522 may form the pulsed laser beam into a fan on the slow (horizontal) axis. In some embodiments, the pulsed laser beam may be focused to form the fanned beam, and in other embodiments, the pulsed laser beam may be expanded to form the fanned beam. In some embodiments, optical devices 522 may be line generator optics to form the pulsed laser beam into a fanned beam. In some embodiments, the pulsed laser beam may be collimated on the fast axis with <0.2 degrees of divergence, and may be focused or expanded on the slow axis to diverge at a rate that produces a fan of substantially four degrees. Beam sizes and divergence values are not necessarily uniform across the various embodiments of the present invention; some embodiments have higher values, and some embodiments have lower values.

Scanning mirror assembly 428 receives the pulsed fanned laser beam from optical devices 420 and scans the pulsed fanned beam in two dimensions. In embodiments represented by FIGS. 4 and 5, scanning mirror assembly 428 includes two separate scanning devices 430, 440, each including a scanning mirror 432, 442, where each scanning mirror scans the beam in one dimension. For example, scanning mirror 432 scans the pulsed fanned beam in the fast scan (vertical) direction, and scanning mirror 442 scans the pulsed fanned beam in the slow scan (horizontal) direction.

Scanning devices 430, 440 are driven by signals 145 received from control circuit 140 (FIGS. 1, 3). For example, scanning mirror 432 may scan in one dimension through first angular extents with a first angular offset as a result of being driven by a first control signal, and scanning mirror 442 may scan in a second dimension through second angular extents with a second angular offset as a result of being driven by a second control signal. In some embodiments, the instantaneous angular deflection of scanning devices 430 and 440 are independently controlled, resulting in a completely configurable field of view along with configurable scan rates.

Although scanning mirror assembly 428 is shown as two mirrors, where each scans in a separate dimension, this is not a limitation of the present invention. For example, in some embodiments, scanning mirror assembly 428 is implemented using a single biaxial mirror that scans in two dimensions. In some embodiments, scanning devices uses electromagnetic actuation, achieved using a miniature assembly containing a MEMS die and small subassemblies of permanent magnets and an electrical interface, although the various embodiments are not limited in this respect. For example, some embodiments employ electrostatic or piezoelectric actuation. Any type of mirror actuation may be employed without departing from the scope of the present invention.

In some embodiments, scanning devices 430, 440 include one or more sensors to detect the angular position or angular extents of the mirror deflection (in one or both dimensions). For example, in some embodiments, scanning mirror 432 includes a piezoresistive sensor that delivers a voltage that is proportional to the deflection of the mirror on the fast-scan axis. Further, in some embodiments, scanning mirror 442 includes an additional piezoresistive sensor that delivers a voltage that is proportional to the deflection of the mirror on the slow-scan axis. In some embodiments, the resulting mirror position feedback signals 111 are provided back to transmit mirror driver 350 to allow phase locked operation. In these embodiments, transmit mirror driver 350 includes one or more feedback loops to modify the drive signals in response to the measured angular deflection of the mirror. In some embodiments, the amplitude and/or frequency of mirror movements are phase locked.

Exit optical devices 450 operate on the scanning pulsed fanned laser beam as it leaves the transmit module. In some embodiments, exit optical devices 450 perform field expansion. For example, scanning mirror assembly 428 may scan through maximum angular extents of 20 degrees on the fast scan axis, and may scan through maximum angular extents of 40 degrees on the slow scan axis, and exit optical devices 450 may expand the field of view to 30 degrees on the fast scan axis and 120 degrees on the slow scan axis. The relationship between scan angles of scanning mirrors and the amount of field expansion provided by exit optical devices 450 is not a limitation of the present invention.

In some embodiments, laser diodes 512, 514, 516, and 518 are high power multimode laser diodes. Multimode laser diodes typically have relatively large emitter areas that result in a beam that diverges faster on one axis than on the other axis. For example, an example 905 nm multimode laser diode may have a 10 um emitter on the fast axis and a 220 um emitter on the slow axis resulting in an emitted beam that inherently diverges faster on the slow axis. Various embodiments take advantage of this non-uniform beam shape by collimating the beam on the axis that naturally diverges more slowly, and focusing the beam into a fan on the axis that naturally diverges more quickly.

Figure 6:
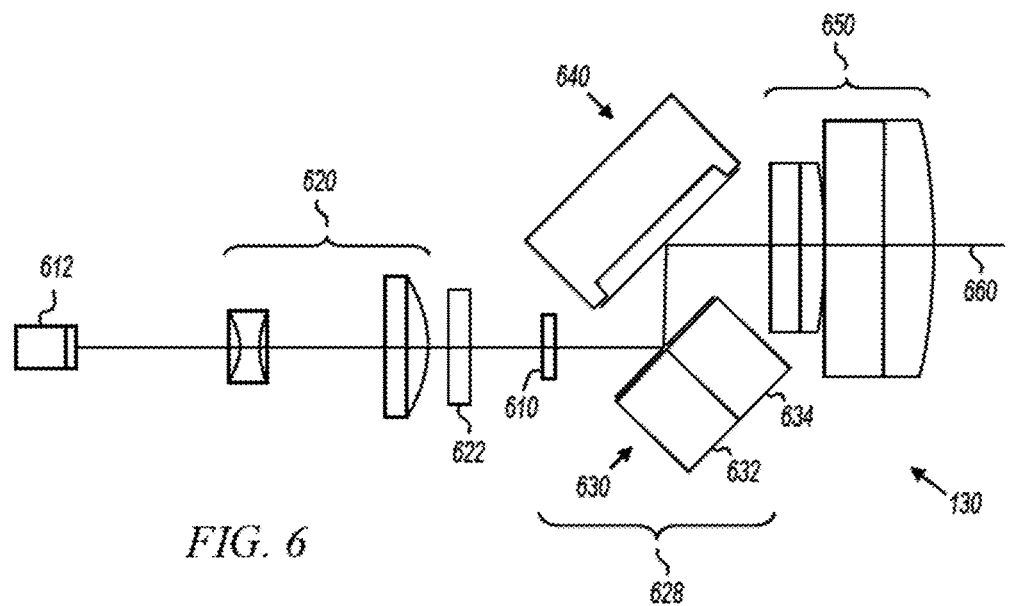
FIG. 6 shows a side view of a receive module in accordance with various embodiments of the present invention.
Figure 7:
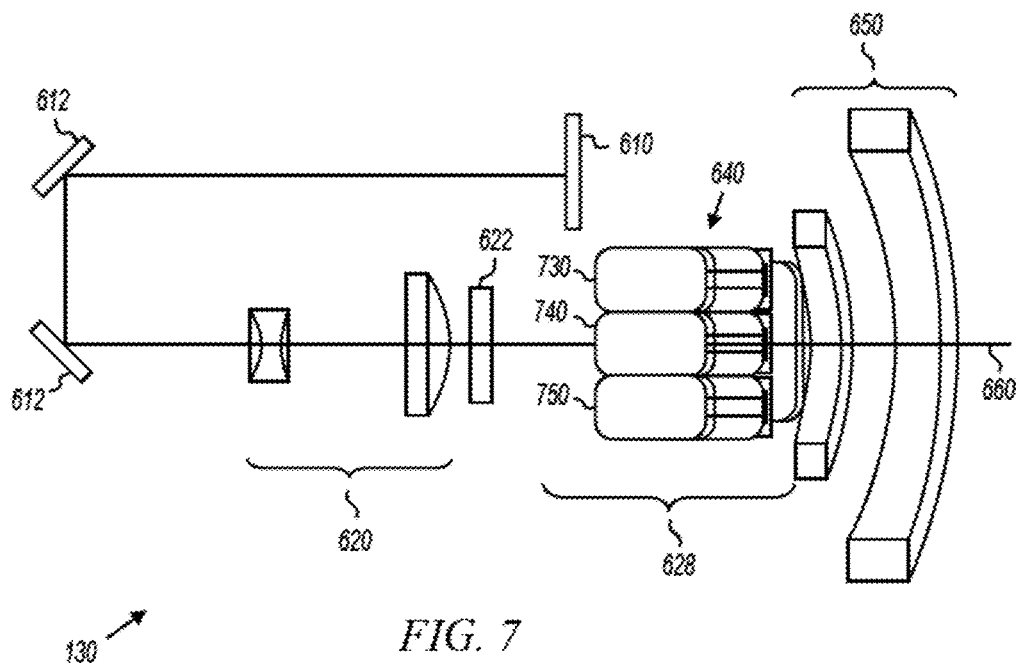
FIG. 7 shows a top view of a receive module in accordance with various embodiments of the present invention.

FIG. 6 shows a side view and FIG. 7 shows a top view of a receive module in accordance with various embodiments of the present invention. Receive module 130 includes arrayed receiver 610, fold mirrors 612, imaging optical devices 620, bandpass filter 622, scanning mirror assembly 628, and exit optical devices 650. FIG. 6 also shows a central light ray 660 that enters from the right in the figure.

Scanning mirror assembly 628 includes a first array of scanning devices 630 to scan in the fast-scan direction, and a second array of scanning devices 640 to scan in the slow-scan direction. The first array of scanning devices 630 includes two scanning devices 632, 634 that have substantially parallel pivot axes. Similarly, the second array of scanning devices 640 includes three scanning devices 730, 740, 750 that have substantially parallel pivot axes. The pivot axes of first array of scanning devices 630 and the second array of scanning devices 640 are substantially perpendicular. As used herein the term "substantially parallel pivot axes" refers to an orientation of an array of scanning mirrors that, when operated together, mimic the operation of a single, larger, scanning mirror. This includes an array of scanning mirrors that have exactly parallel pivot axes as well as arrays of scanning mirrors that have pivot axes close enough to parallel to allow operation as described herein. Further, as used herein, the term "substantially perpendicular" refers to the relationship of pivot axes between two arrays of scanning mirrors that allow the two arrays to reflect light in two different directions. This includes two arrays of scanning mirrors that have exactly perpendicular pivot axes, as well as arrays of scanning mirrors that have pivot axes close enough to perpendicular to allow operation as described herein.

Exit optical devices 650 are similar or identical to exit optical devices 450. Bandpass filter 622 passes the wavelength of light that is produced by laser light source 410, and blocks ambient light of other wavelengths. For example, in some embodiments, laser light source produces light at 905 nm, and bandpass filter 622 passes light at 905 nm.

Imaging optical devices 620 image a portion of the field of view onto arrayed receiver 610 after reflection by fold mirrors 612. For example, in some embodiments, optical devices 620 image the area 126 (FIG. 1) onto arrayed receiver 610. Because scanning mirror assembly 628 is scanned synchronously with scanning mirror assembly 428, arrayed receiver 610 always collects light from the measurement points illuminated by the scanned pulsed fanned beam.

Arrayed receiver 610 includes an array of light sensitive devices. The array of light sensitive devices may be one-dimensional or two-dimensional. For example, in some embodiments, arrayed receiver 610 includes a 1×M array of PIN photodiodes, Silicon photomultipliers (SiPM), avalanche photodiodes (APD), or the like, where M is any integer. Also for example, in some embodiments, arrayed receiver 610 includes a N×M array of PIN photodiodes, Silicon photomultipliers (SiPM), avalanche photodiodes (APD), or the like, where N and M are any integers. Any number of light sensitive devices may be included without departing from the scope of the present invention. For example, in some embodiments, 16 light sensitive devices are included, and in other embodiments, 24 light sensitive devices are included.

FIGS. 8 and 9 show scanning mirror assemblies with arrays of scanning MEMS devices. FIGS. 8 and 9 show two different perspective views of the same scanning mirror assembly 628.

Each of the scanning MEMS devices includes a silicon micromachined scanning device supported by flexures that form a pivot axis. A mirror is attached to the micromachined scanning device such that, when in operation, the mirror scans on the pivot axis. For example, scanning MEMS device 730 includes mirror 732, scanning MEMS device 740 includes mirror 742, scanning MEMS device 750 includes mirror 752, scanning MEMS device 632 includes mirror 832, and scanning MEMS device 634 includes mirror 842.

As shown in the figures, the mirrors in a single array are substantially coplanar when at rest. As used herein, the term "substantially coplanar" refers to a relative position of mirrors that is either exactly coplanar or close enough to coplanar to allow operation as described herein. Each array of MEMS devices combine to form a larger effective aperture than is possible with a single MEMS device of the same size.

In operation, the angular position and scan frequency for each of the MEMS devices in an array are synchronized so that the mirrors in the array mimic a single, larger mirror without requiring a corresponding increase in required energy when operating at high frequency.

Although each array of scanning MEMS device 630, 640 is shown as a one-dimensional array, this is not a limitation of the present invention. Any size array including any number of scanning MEMS devices may be incorporated without departing from the scope of the present invention.

Figure 10:
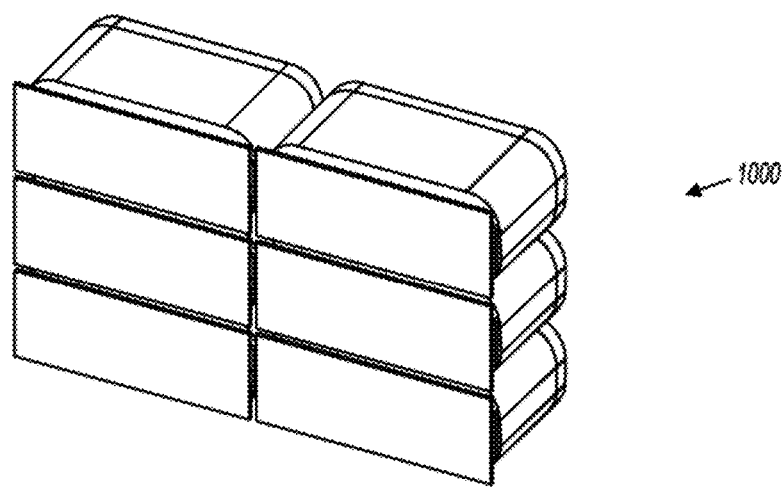
FIG. 10 shows a two-dimensional array of scanning MEMS devices.

FIG. 10 shows a two-dimensional array of scanning MEMS devices. Array 1000 includes an M×N array of individually controllable mirrors capable of being actuated through a scan angle in a synchronized manner to act effectively as a larger aperture, where M=2 and N=3. In some embodiments, array 1000 is used to implement array 630, and in other embodiments, array 1000 is used to implement array 640. Each mirror is a single unit fabricated separately, multiple units are ganged together to have a scalable architecture to a 1×N or M×N array.

In some embodiments, each of the MEMS devices includes magnetic actuation circuitry, and in other embodiments, each of the MEMS devices includes piezoelectric actuating circuitry. The control circuitry used to actuate the MEMS devices and cause scanning mirror movement is not a limitation of the present invention.

Figure 11:
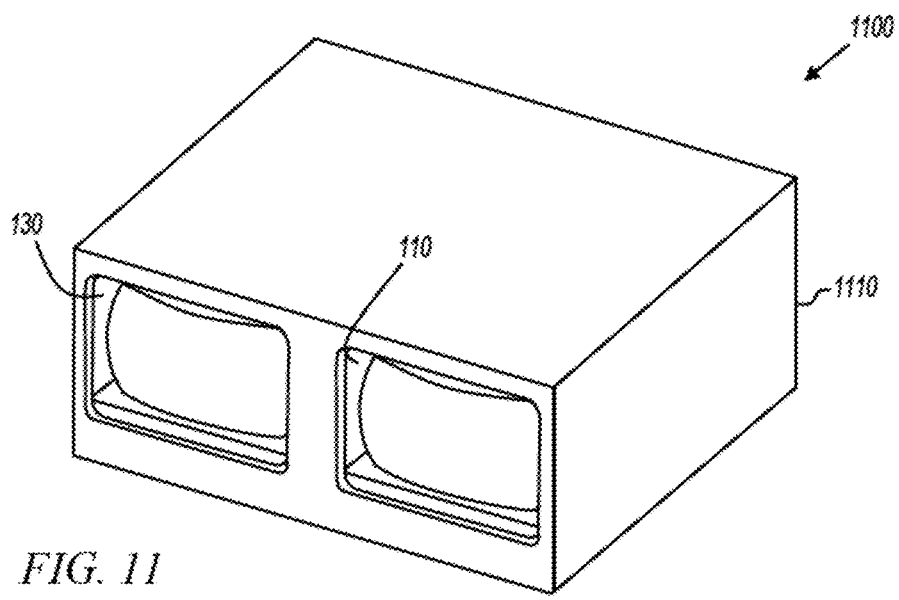
FIG. 11 shows a perspective view of an integrated photonics module in accordance with various embodiments of the present invention.

FIG. 11 shows a perspective view of an integrated photonics module in accordance with various embodiments of the present invention. Integrated photonics module 1100 is shown having a rectangular housing 1110 with transmit module 110 and receive module 130 placed side by side. In some embodiments, transmit module 110 and receive module 130 are placed one on top of the other. The relative orientation of transmit module 110 and receive module 130 is not a limitation of the present invention.

Figure 12:
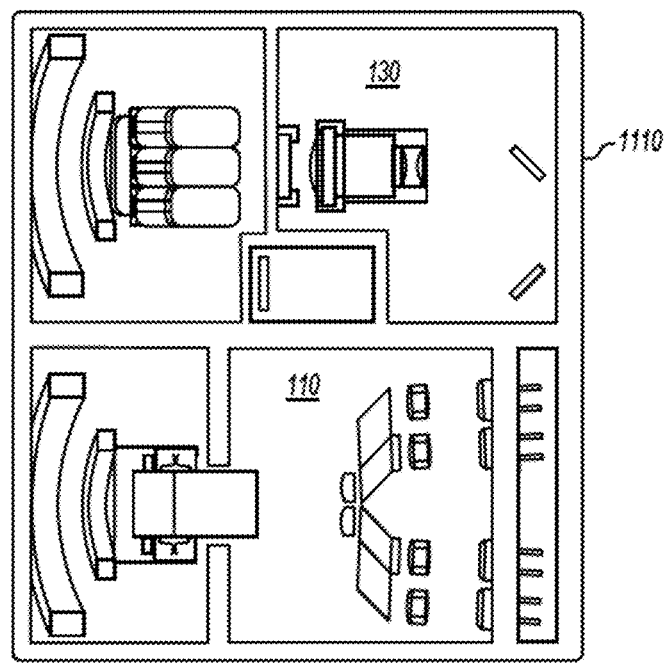
FIG. 12 shows a cross sectional top view of the integrated photonics module of FIG. 11.
Figure 13:
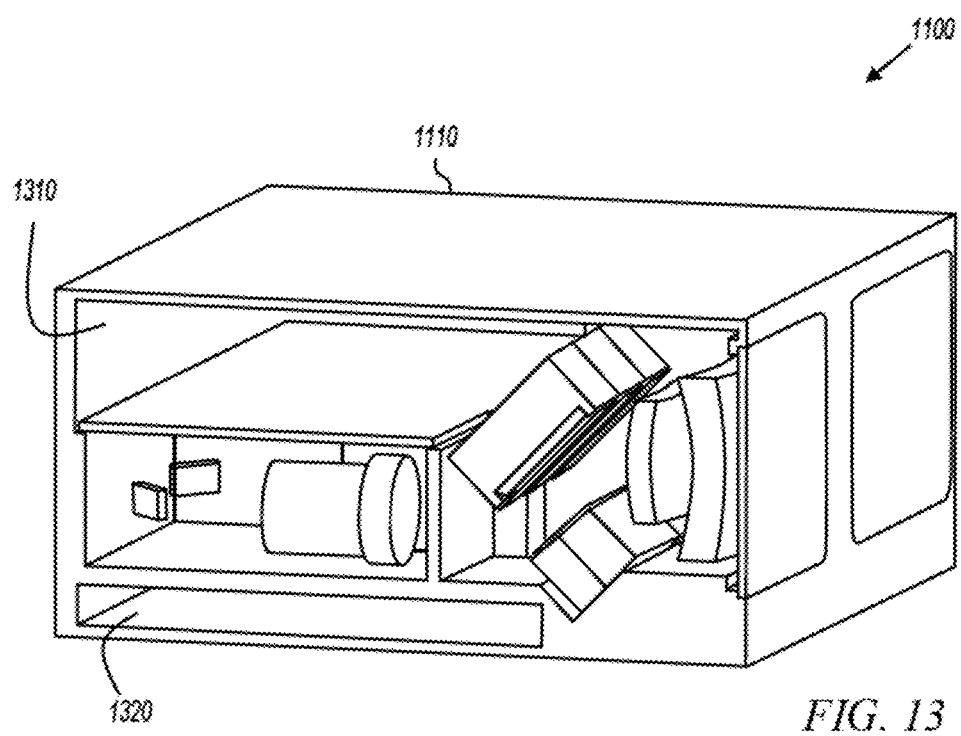
FIG. 13 shows a cross sectional perspective view of the integrated photonics module of FIG. 11.

FIG. 12 shows a cross sectional top view and FIG. 13 shows a cross sectional perspective view of the integrated photonics module of FIG. 11. Transmit module 110 and receive module 130 are shown side by side. In some embodiments, space is provided for electronics above (1310) and below (1320) the rearmost optical devices in integrated photonics module 1100. Any amount of system electronics may be included within module 1100. For example, in some embodiments, all components shown in FIG. 1 are included in module 1100. Also for example, in some embodiments, only control circuits and TOF measurement circuits are included in module 1100.

Figure 14:
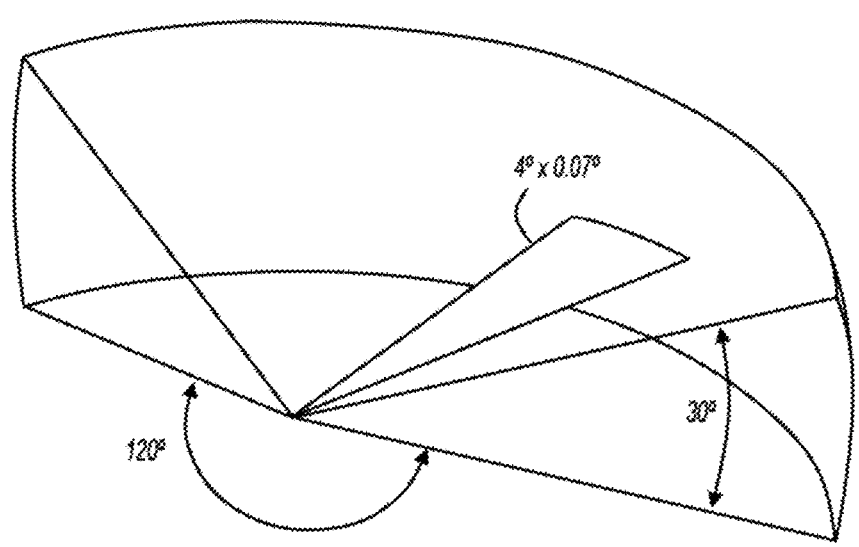
FIG. 14 shows a fanned beam in a field of view in accordance with various embodiments of the present invention.

FIG. 14 shows a fanned beam in a field of view in accordance with various embodiments of the present invention. The field of view in the example of FIG. 14 spans 120 degrees horizontally and 30 degrees vertically. This corresponds to the example provided with reference to FIG. 4 in which the transmit module exit optics expand the field of view to 120 degrees by 30 degrees. The pulsed fanned laser beam in FIG. 14 is four degrees in the horizontal axis and 0.07 degrees on the vertical axis. In some embodiments, the pulsed fanned laser beam is wider than four degrees, and in other embodiments, the pulsed fanned laser beam is narrower than four degrees. Further in some embodiments, the pulsed fanned laser beam is taller than 0.07 degrees, and in other embodiments, the pulsed fanned laser beam is shorter than 0.07 degrees.

As described above, the fanned beam is scanned in two dimensions in the field of view. The fast-scan direction is usually, but not necessarily, the vertical direction, and the slow-scan direction is usually, but not necessarily, the horizontal direction. The scan frequency of the slow axis relative to the scan frequency on the fast axis determines the number of fast scan passes per slow scan pass. Each slow scan pass is referred to herein as a "frame." The ratio of width (in degrees of field of view) of the fast scan cycle to width of the laser fan determines the number of frames per complete scene acquisition.

The field of view may be run at a reduced angle relative to the maximum operating point by modifying angular extents. This can be used to alter the ratio of fast scan cycle width to laser fan width and the resulting scan/fill pattern of the TOF pulses. Furthermore, due to the completely non-resonant drive scanning mirror system design, a pointing angle offset may be applied in two dimensions by modifying angular offsets to shift the reduced imaging area inside the accessible scene.

Figure 15:
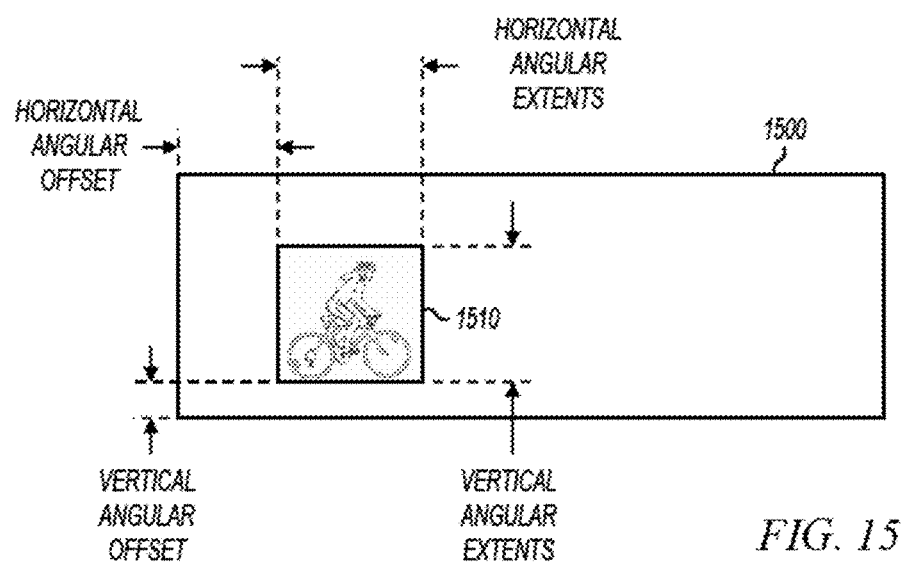
FIG. 15 shows a modified field of view for object tracking in accordance with various embodiments of the present invention.

FIG. 15 shows a modified field of view for object tracking in accordance with various embodiments of the present invention. Field of view 1500 represents the maximum field of view attainable by the LIDAR system. Field of view 1510 represents a modified field of view. Modified field of view 1510 has reduced angular extents of mirror deflection in both the fast axis and slow axis, and also has nonzero angular offsets on both the fast axis and slow axis. In some embodiments, the modified angular extents and offsets are produced by control circuit 140 to track an object that has identified by computer vision processing 170. In other embodiments, the modified angular extents and offsets are produced by control circuit 140 in response to other input data. In embodiments represented by FIG. 15, the angular offsets are shown referenced to the edge of field of view 1500, although this is not a limitation of the present invention. For example, the angular offsets may be referenced to the mirror relaxation point in the center of the field of view.

Figure 16:
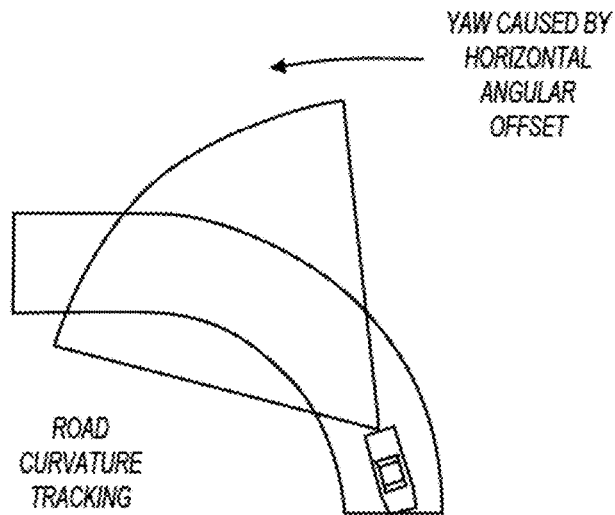
FIG. 16 shows a modified field of view for road curvature tracking in accordance with various embodiments of the present invention.

FIG. 16 shows a modified field of view for road curvature tracking in accordance with various embodiments of the present invention. The example of FIG. 16 demonstrates the effect of a nonzero angular offset on the horizontal axis with or without a nonzero angular offset on the vertical axis. In some embodiments, a road curvature is tracked by computer vision processing 170, and control circuit 140 modifies the field of view in response.

Figure 17:
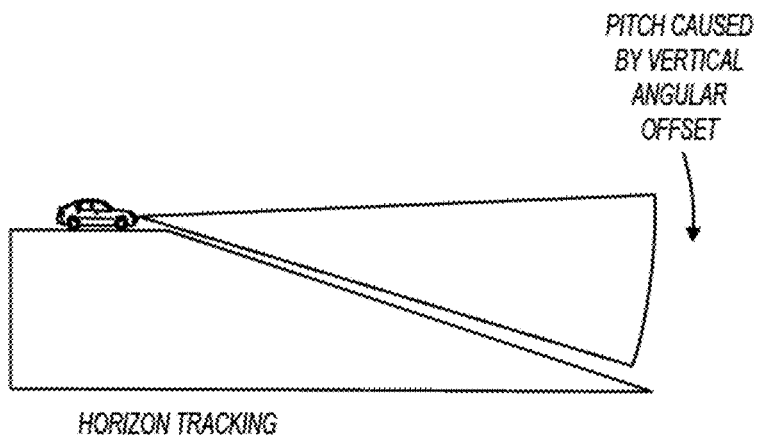
FIG. 17 shows a modified field of view for horizon tracking in accordance with various embodiments of the present invention.

FIG. 17 shows a modified field of view for horizon tracking in accordance with various embodiments of the present invention. The example of FIG. 17 demonstrates the effect of a nonzero angular offset on the vertical axis with or without a nonzero angular offset on the horizontal axis. In some embodiments, a horizon is tracked by computer vision processing 170, and control circuit 140 modifies the field of view in response.

In some embodiments, a similar approach is used for bump correction, stabilizing the field of view so that captured points from the scene do not need to be cropped or adjusted relative to the calibrated angular perspective relative to the driving surface and ego vehicle.

Figure 18:
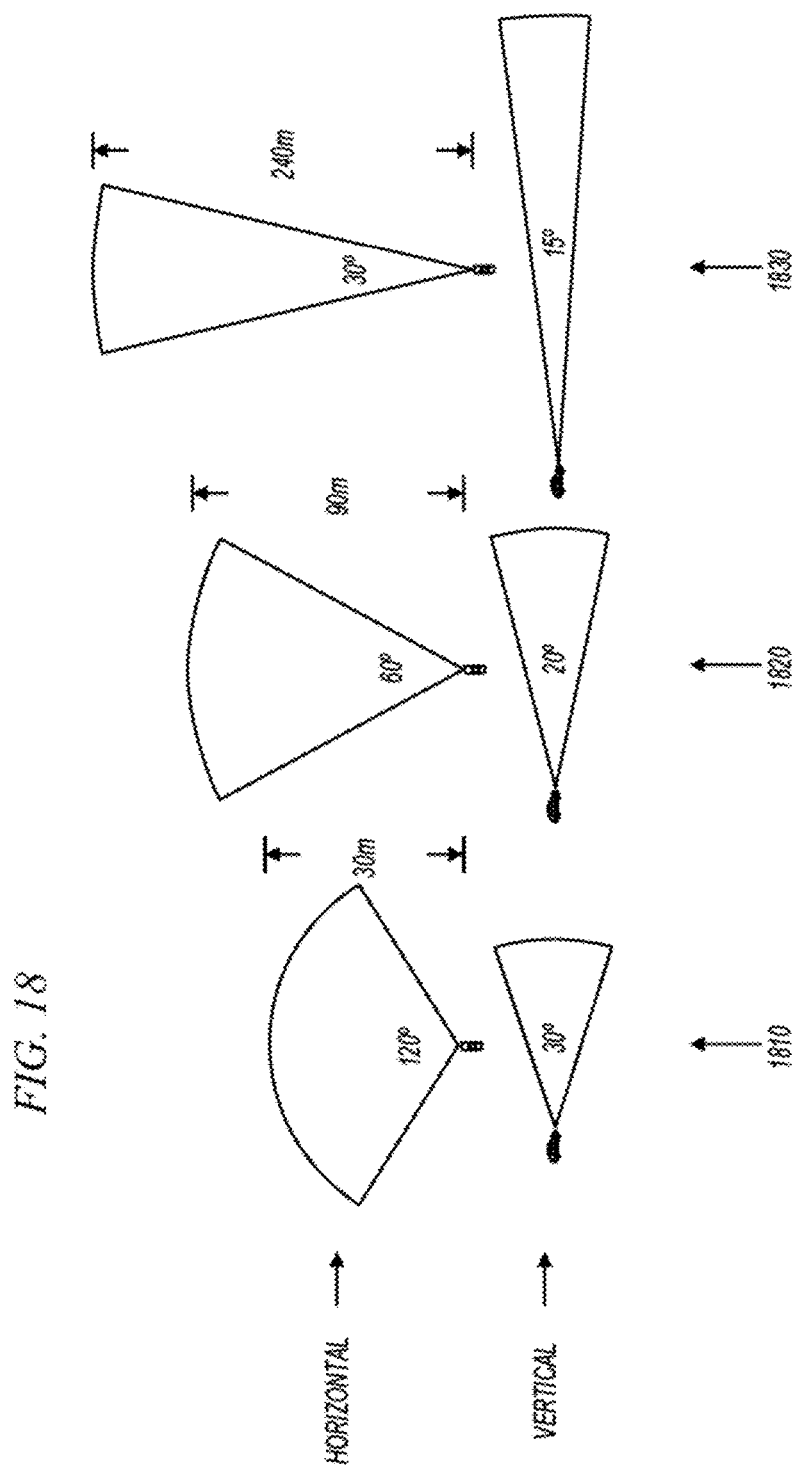
FIG. 18 shows adjustable angular extents and distance of interest control in accordance with various embodiments of the present invention.

FIG. 18 shows adjustable angular extents and distance of interest control in accordance with various embodiments of the present invention. FIG. 18 shows three different scenarios, each of which includes different horizontal and vertical angular extents. In operation, any number of scenarios is possible, limited only by the resolution which the angular extents may be modified.

Scenario 1810 represents the maximum field of view for the nominal design case with a horizontal field of view of 120 degrees and a vertical field of view of 30 degrees. The various embodiments of the present invention are not limited to this nominal design case, as in some embodiments, the maximum field of view is larger than 120 degrees by 30 degrees, and in other embodiments, the maximum field of view is smaller than 120 degrees by 30 degrees.

Scenario 1820 shows a modified field of view. The horizontal angular extents have been reduced to 60 degrees and the vertical angular extents have been reduced to 20 degrees. Scenario 1830 shows a further modified field of view. The horizontal angular extents have been further reduced to 30 degrees and the vertical angular extents have been further reduced to 15 degrees.

Reducing the angular extents as shown in FIG. 18 allows the system to increase the distance of interest without loss to angular resolution. As used herein, the term "distance of interest" refers to a distance at which the LIDAR system is imaging the scene. For example, in scenario 1810, the distance of interest may be about 30 meters (m), in scenario 1820 the distance of interest may be about 90 m, and in scenario 1830, the distance of interest may be about 240 m. In each of these scenarios, other system properties may be modified to support imaging at the distance of interest. For example, laser power may be increased, pulse rate may be decreased, and the like.

Figure 19:
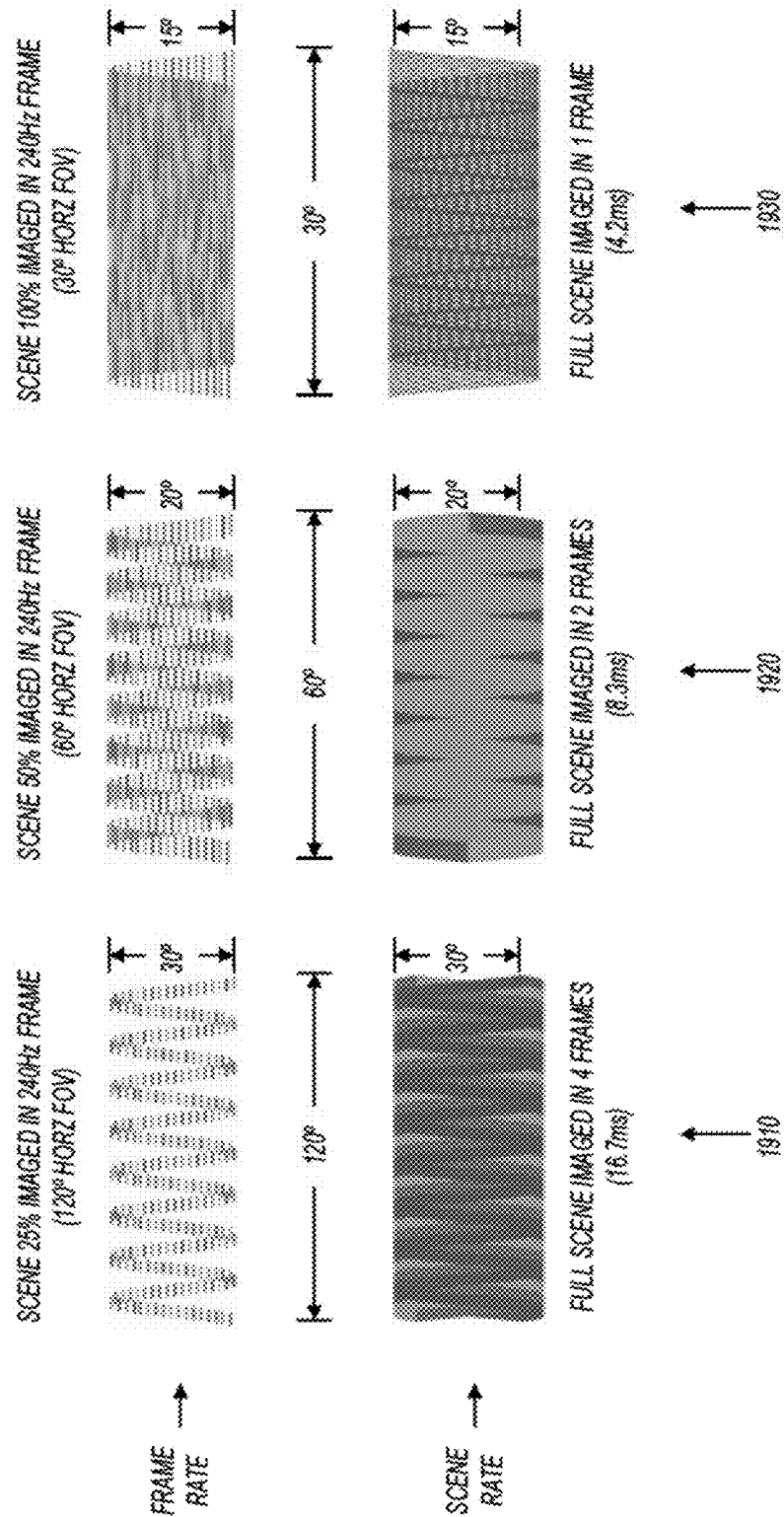
FIG. 19 shows scene imaging scenarios in accordance with various embodiments of the present invention.

FIG. 19 shows scene imaging scenarios in accordance with various embodiments of the present invention. As the field of view is reduced as shown in FIG. 18, the rate at which the entire scene is scanned may change. As used herein the term "scene rate" refers to the rate at which the entire scene is imaged. The scene rate may be as high as the frame rate when a single slow axis pass images the entire scene, or the scene rate may lower than the frame rate when multiple slow axis passes are required to image the entire scene. In some embodiments, a "super-resolution" scheme is employed by adding phase offsets to the fast axis scan in subsequent frames to fill in the entire scene when scene rate is lower than the frame rate.

The top half of FIG. 19 shows imaging coverage in a single frame for various fields of view, and the bottom half of FIG. 19 shows the number of frames necessary to image the entire scene. The field of view in scenario 1910 corresponds to the field of view in scenario 1810 (FIG. 18), the field of view in scenario 1920 corresponds to the field of view in scenario 1820 (FIG. 18), and the field of view in scenario 1930 corresponds to the field of view in scenario 1830 (FIG. 18).

As shown in scenario 1910, in embodiments with 120 degree maximum horizontal field of view, a four degree laser fan angle, and an active ratio of 8 fast cycles to one slow cycle, four frames need elapse to image a full scene (with some small overlap) via phase-staggered super-resolution. Given a native frame rate of 240 Hz, the full scene would then be imaged (scene rate) at 60 Hz, over the complete 120 horizontal field of view.

As shown in scenario 1920, when the horizontal field of view is reduced by one half (to 60 degrees), only two frames need elapse to completely image the scene. In this scenario, the scene rate is doubled to 120 Hz. Further as shown in scenario 1930, when the horizontal field of view is reduced by half again (to 30 degrees), the entire scene can be imaged at the native 240 Hz rate. In this scenario, the frame rate and scene rate are equal.

In some embodiments, the point cloud is updated at the scene rate. For example, the point cloud data in storage 160 (FIG. 1) may be updated each time the entire scene is imaged. Accordingly, as the horizontal field of view is reduced, the point cloud update rate may be increased, leading to faster computer vision processing updates, and potentially faster object recognition, lane tracking, and the like.

Because of this relationship between horizontal field of view reduction and increased update rate, latency in point cloud processing and perception layers may be reduced as the distance of interest is increased. Alternatively, the update rate may be maintained, and the additional scene acquisitions associated with reduced horizontal field of view at increased distances of interest may be used to increase signal-to-noise ratio (SNR) via averaging. In some embodiments, this may include a simple box averaging scheme or may use a more advanced form of spatio-temporal Bayesian filtering.

Figure 20:
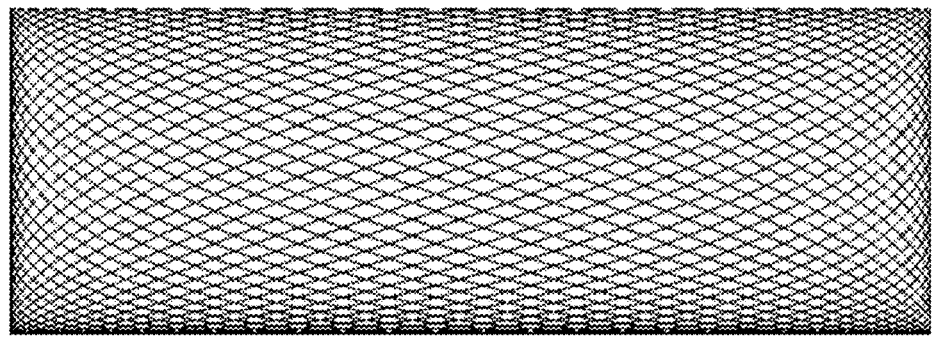
FIG. 20 shows example adaptive operating modes in accordance with various embodiments of the present invention.

FIG. 20 shows example adaptive operating modes in accordance with various embodiments of the present invention. In the example adaptive modes of FIG. 17, angular extents and laser pulsing parameters are adaptively modified based on vehicle speed. In some embodiments, the adaptive modes are software controlled as the vehicle speed changes and in other embodiments, the adaptive modes are under hardware control. For example, referring now back to FIG. 3, in some embodiments, the extents, offsets, and laser pulsing parameters are modified under software control in response to vehicle sensor inputs. Also for example, in some embodiments, the extents, offsets, and laser pulsing parameters are modified under hardware control by digital logic 330 in response to vehicle sensor inputs. Further, the adaptive scenarios under hardware control may be software configurable such that the extents, offsets, and laser pulsing parameters as a function of vehicle sensor inputs are established under software control and then subsequently modified real-time under hardware control.

The notion of collapsing the active field of view and increasing the distance of interest with increasing vehicle speed naturally mimics that of a human driver's visual/mental processing. A vehicle traveling quickly will need more time for braking or maneuvering when an avoidance event occurs, so the gaze naturally goes out to allow for awareness to focus on objects in the far field. A stationary or slow-moving vehicle, on the other hand, need not focus on objects far away, but instead utilizes a greater field of view to safely interact with objects on the near/side periphery which at this speed may interact with the vehicle.

FIG. 21 shows alternate scanning patterns in the field of view in accordance with various embodiments of the present invention. Scanning pattern 2100 includes sinusoidal scanning on both the fast axis and the slow axis. One advantage of sinusoidal scanning is the narrow control bandwidth used to control such trajectories. Some embodiments use purely sinusoidal scanning as shown in FIG. 18, and other embodiments use a small number of harmonics to approach a ramp while still limiting the control bandwidth necessary to control mirror movement. In general, any scanning trajectory may be used without departing from the scope of the present invention.

Figure 22:
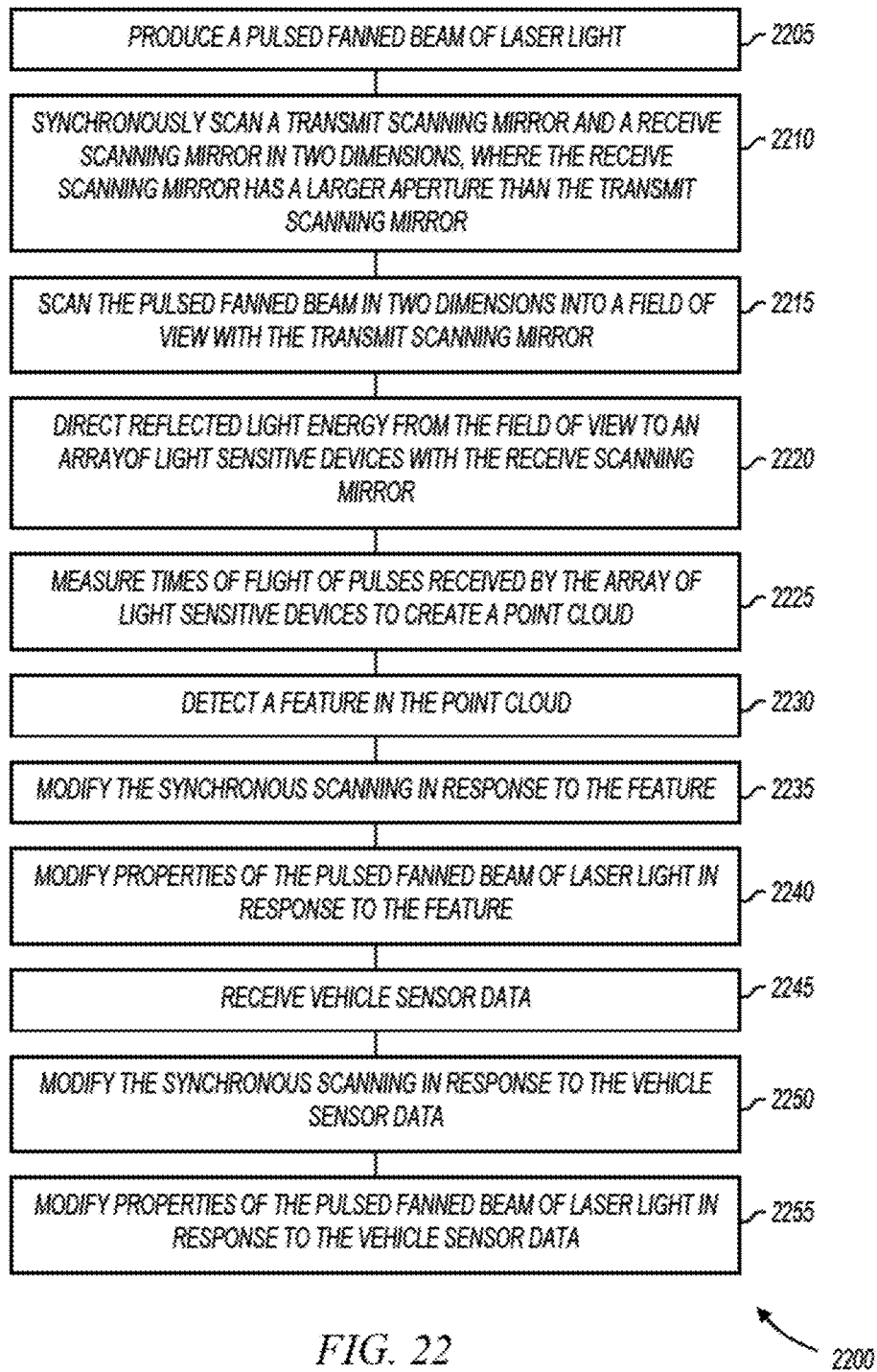
FIG. 22 shows a flow diagram of methods in accordance with various embodiments of the present invention.

FIG. 22 shows a flow diagram of methods in accordance with various embodiments of the present invention. In some embodiments, method 2200, or portions thereof, is performed by a scanning LIDAR system or a scanning LIDAR module. In other embodiments, method 2200 is performed by a series of circuits or an electronic system. Method 2200 is not limited by the particular type of apparatus performing the method. The various actions in method 2200 may be performed in the order presented, or may be performed in a different order. Further, in some embodiments, some actions listed in FIG. 22 are omitted from method 2200.

Method 2200 is shown beginning with block 2205 where a pulsed fanned beam of laser light is produced. In some embodiments, a pulsed laser beam is produced by a single laser diode, and in other embodiments, the pulsed laser beam is performed by a plurality of laser diodes. The pulsed laser beam is collimated and focused into a fanned beam as described above. The fanned beam may have any width (in degrees of field of view) without departing from the scope of the present invention.

At 2210, a transmit scanning mirror and a receive scanning mirror are synchronously scanned in two dimensions where the receive scanning mirror has a larger aperture than the transmit scanning mirror. This corresponds to scanning mirror assemblies within transmit module 110 and receive module 130 synchronously scanning. In some embodiments, the larger aperture is achieved by forming one or more arrays of substantially coplanar, individually activated, scanning mirrors. For example, a scanning mirror assembly with two arrays such as scanning mirror assembly 628 may be employed to form a larger effective receive aperture.

At 2215, the pulsed fanned beam is scanned in two dimensions into a field of view with the transmit scanning mirror. This is illustrated in FIG. 1 where the transmit module is shown scanning the pulsed fanned beam 112 into the field of view 128, and the fan has the shape shown at 124. At 2220, reflected light energy from the field of view is directed to an array of light sensitive devices with the receive scanning mirror. The synchronous scanning of the transmit and receive scanning mirrors results in light collected from a localized area shown at 126 (FIG. 1) being directed to the arrayed receiver.

At 2225, times-of-flight of the detected light reflections are measured to create a point cloud. This corresponds to the operation of the various TOF measurement circuits described above.

At 2230, a feature is detected in the point cloud. This may correspond to the operation of computer vision processing 170 as they perform object detection, lane detection, horizon tracking, or the like. At 2235, the synchronous scanning of the transmit scanning mirror and receive scanning mirror is modified in response to the feature detected at 2230. For example, angular extents of mirror deflection and/or angular offsets of mirror deflection may be modified to track objects, traffic lanes, or horizons in the field of view. At 2240, properties of the pulsed fanned beam of laser light are modified in response to the feature detected at 2230. For example, pulse power, pulse rate, pulse width, and/or number of multishot pulses may be modified in response to the feature detected at 2230.

At 2245, vehicle sensor data is received. This may correspond to control circuit 140 receiving data from vehicle sensors such speed sensors, inertial measurement unit (IMU) sensors, or the like. At 2250, the synchronous scanning of the transmit scanning mirror and receive scanning mirror is modified in response to the vehicle sensor data received at 2245. For example, angular extents of mirror deflection and/or angular offsets of mirror deflection may be modified in response to vehicle speed data or other vehicle sensor data. At 2255, properties of the pulsed fanned beam of laser light are modified in response to the vehicle sensor data received at 2245. For example, pulse power, pulse rate, pulse width, and/or number of multishot pulses may be modified in response to the vehicle sensor data received at 2245.

Although the present invention has been described in conjunction with certain embodiments, it is to be understood that modifications and variations may be resorted to without departing from the scope of the invention as those skilled in the art readily understand. Such modifications and variations are considered to be within the scope of the invention and the appended claims.

What is claimed is:

1. A light detection and ranging system comprising:
a laser light source to produce laser light pulses;
a first scanning mirror assembly to scan the laser light pulses in two dimensions in a field of view;
a light sensitive device to detect reflected light energy;
a second scanning mirror assembly to scan in two dimensions and direct light from a portion of the field of view onto the arrayed receiver, wherein the second scanning mirror assembly includes a plurality of scanning mirrors to scan in one of the two dimensions;
a control circuit to synchronously drive the first and second scanning mirror assemblies such that reflected light energy from the laser light pulses is deposited on the light sensitive device; and
a time-of-flight measurement circuit responsive to the light sensitive device.

2. The light detection and ranging system of claim 1 wherein the first and second scanning mirror assemblies scan in a non-resonant motion.

3. The light detection and ranging system of claim 1 wherein the second scanning mirror assembly includes pluralities of scanning mirrors to scan in each of the two dimensions.

4. The light detection and ranging system of claim 3 wherein the second scanning mirror assembly includes three scanning mirrors to scan in a horizontal direction and two scanning mirrors to scan in a vertical direction.

5. The light detection and ranging system of claim 1 wherein each of the plurality of scanning mirrors is attached to a separate, individually actuated, microelectromechanical system (MEMS) device.

6. The light detection and ranging system of claim 1 wherein the plurality of scanning mirrors to scan in one of the two dimensions comprises a one-dimensional array of scanning mirrors.

7. The light detection and ranging system of claim 1 wherein the plurality of scanning mirrors to scan in one of the two dimensions comprises a two-dimensional array of scanning mirrors.

8. The light detection and ranging system of claim 1 wherein the laser light source comprises a plurality of laser diodes.

9. The light detection and ranging system of claim 8 further comprising an optical device to focus the laser light pulses into a fanned beam.

10. The light detection and ranging system of claim 9 further comprising an arrayed receiver that includes the light sensitive device, and wherein the second scanning mirror assembly is driven such that reflected light energy from the laser light pulses is deposited on the arrayed receiver.

11. An apparatus comprising:
a first plurality of scanning MEMS devices having mirrors positioned to be substantially coplanar when at rest, wherein each of the first plurality of scanning MEMS devices includes a substantially parallel pivot axis; and
a second plurality of scanning MEMS devices having mirrors positioned to receive light reflected from the first plurality of scanning MEMS assemblies, wherein each of the second plurality of MEMS devices includes a pivot axis substantially perpendicular to the pivot axes of the first plurality of scanning MEMS devices.

12. The apparatus of claim 11 further comprising a control circuit to individually control movement of the first and second plurality of scanning MEMS devices to create a receive aperture that is larger than a single scanning MEMS device.

13. The apparatus of claim 12 further comprising an array of light sensitive devices positioned to receive reflections of light from the second plurality of scanning MEMS devices.

14. The apparatus of claim 13 further comprising:
at least one laser light source to emit laser light pulses; and
a plurality of time-of-flight measurement circuits responsive to the array of light sensitive devices.

15. The apparatus of claim 14 further comprising an optical device to focus the laser light pulses into a fanned beam.

16. The apparatus of claim 11 wherein the first plurality of scanning MEMS assemblies comprises a one-dimensional array of scanning MEMS assemblies.

17. The apparatus of claim 11 wherein the first plurality of scanning MEMS assemblies comprises a two-dimensional array of scanning MEMS assemblies.

18. A method comprising:
producing laser light pulses;
scanning the laser light pulses in two dimensions in a field of view;
receiving reflections of the laser light pulses with a first array of scanning mirror assemblies with parallel pivot axes;
reflecting light from the first array of scanning mirror assemblies to a light sensitive device using a second array of scanning mirror assemblies having pivot axes substantially perpendicular to the pivot axes of the first array of scanning mirror assemblies; and
measuring times-of-flight of reflected laser light pulses detected by the light sensitive device.

19. The method of claim 18 wherein the first array of scanning mirror assemblies comprises a one-dimensional array of scanning mirror assemblies.

20. The method of claim 18 wherein the first array of scanning mirror assemblies comprises a two-dimensional array of scanning mirror assemblies.

* * * * *